Sept. 15, 1931.   R. DUCROUX   1,823,790
SHIP'S SCUTTLE
Filed July 19, 1930   3 Sheets-Sheet 1

INVENTOR.
René Ducroux.
By William C. Linton
Attorney.

Sept. 15, 1931.  R. DUCROUX  1,823,790
SHIP'S SCUTTLE
Filed July 19, 1930  3 Sheets-Sheet 2

INVENTOR
René Ducroux.
By William C. Linton
Attorney.

Sept. 15, 1931. R. DUCROUX 1,823,790
SHIP'S SCUTTLE
Filed July 19, 1930 3 Sheets-Sheet 3
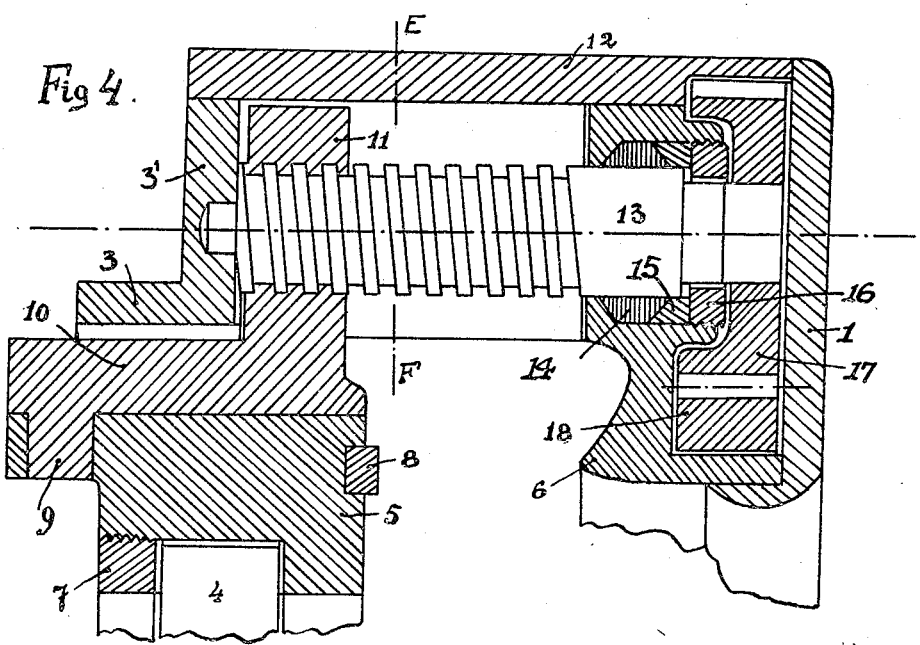
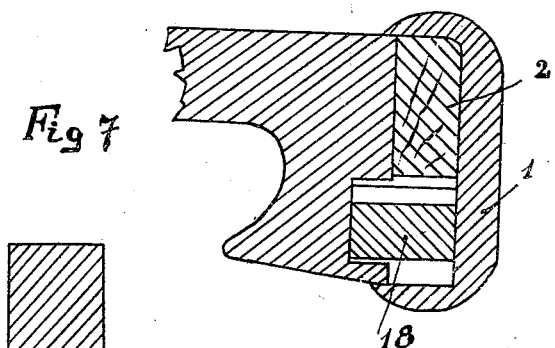
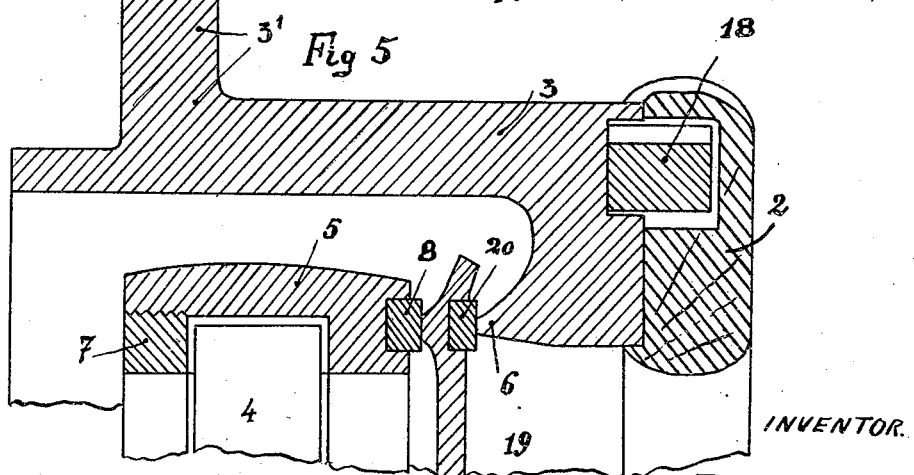
INVENTOR.
René Ducroux.
By William C. Linton
Attorney.

Patented Sept. 15, 1931

1,823,790

UNITED STATES PATENT OFFICE

RENÉ DUCROUX, OF ST.-NAZAIRE, FRANCE

SHIP'S SCUTTLE

Application filed July 19, 1930, Serial No. 469,126, and in France August 1, 1929.

This invention relates to ships' scuttles of the kind in which the glass holder is pivotally mounted in a suitable support or supports adapted to be moved, by means of screws adapted to be actuated by hand operated gearing or otherwise, inwardly towards the seat ring in the fixed frame of the scuttle and at the inner or cabin side of the latter so as to bring the glass holder into contact with the seat ring in or on the fixed frame and so close the scuttle and to be moved outwardly from the fixed frame in order to open the scuttle.

In ships' scuttles of the kind hereinbefore referred to, a part of the fixed frame together with a sector of the seat ring at the inner or cabin side of a scuttle had to be removed in order to enable the glass holder to be inserted into the fixed frame from the inner or cabin side of the scuttle, but the seat ring thus having a removable sector, does not present a continuous surface and may give rise to a leaky joint between the glass holder and the fixed frame.

In accordance with the principal feature of the invention, this disadvantage is obviated by imparting to the fixed frame of a scuttle of the kind hereinbefore referred to and to the glass holder, a slightly oval form and mounting the glass holder so as to be readily removable from its supports from the inner side of the scuttle, so that the glass holder may, after being removed from its supports, be passed through the frame with its smaller diameter along the larger diameter of the frame. Thus in accordance with the invention, the seat ring of the frame can be formed of a single piece. It should be added that this arrangement permits, in accordance with the invention, the introduction of a watertight safety member between the glass holder and the frame of the scuttle.

The scuttle is arranged to be closed in a known manner. The pivots of the glass holder are accommodated in sliding members adapted to be moved parallel to the axis of the frame of the scuttle by means of the screws operatively connected to pinions engaging with a toothed wheel.

One of the advantages resulting from the improvements of the invention, is that the internal crown of the frame or casing is in one piece and has no parts that it is necessary to remove for introducing the glass holder which can be decorated in a particularly novel manner, either by a crown of varnished wood, or plastic, or ceramic material or moulded glass so as to be in harmony with the decoration of the cabin or of the locality where the scuttle is provided.

The invention will now be described by way of example, with reference to the accompanying drawings, in which:

Figure 4 is a section on the line A—B of Figure 3.

Figure 5 is a sectional view on a relatively large scale on the line C—D of Figure 1.

Figure 7 is a section on the line G—H of Figure 3.

Figure 1:
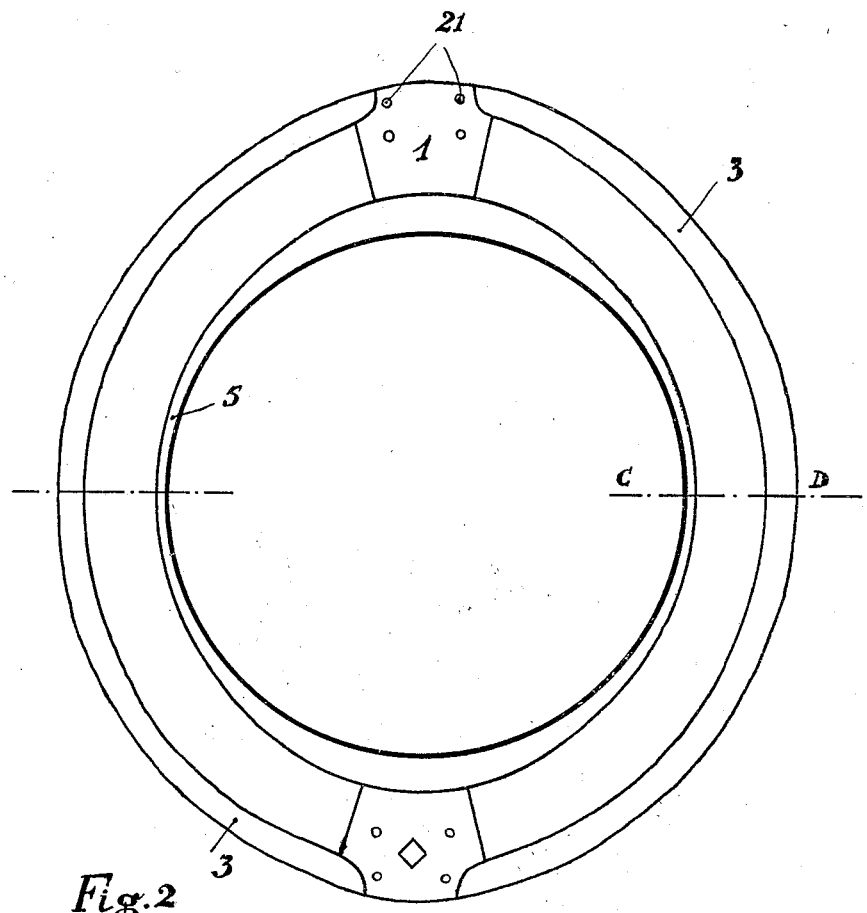
Figure 1 is a view in elevation of a scuttle embodying the improvements of the invention.
Figure 2:
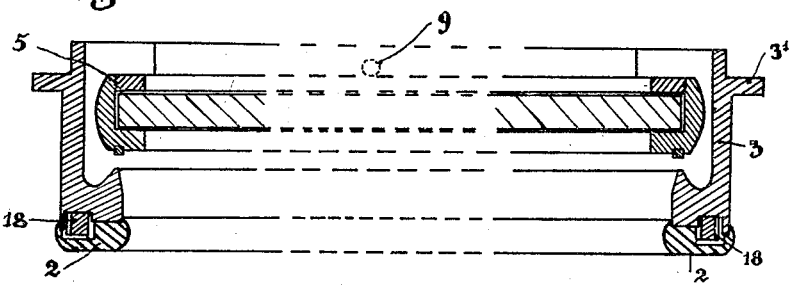
Figure 2 is a section on the line CD—CD of Figure 1.
Figure 3:
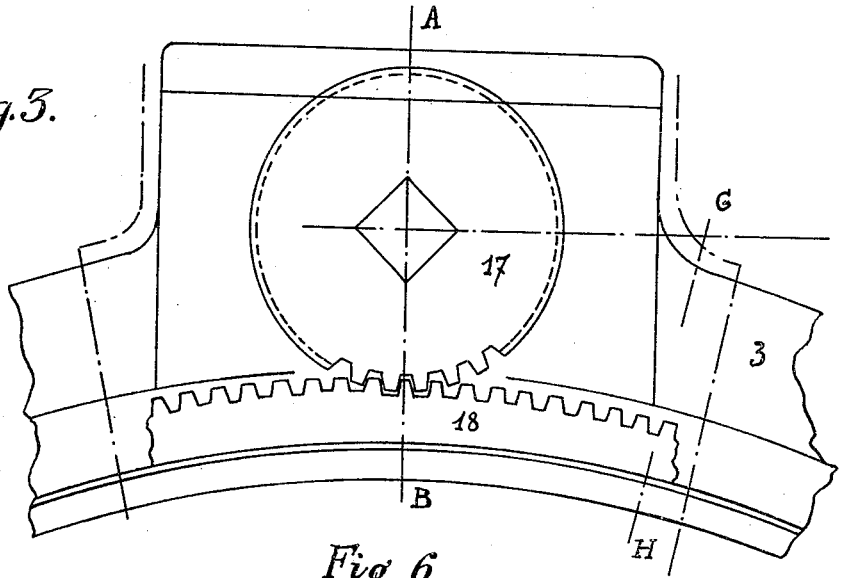
Figure 3 is a view on a larger scale of the interior face of the upper or lower part of the frame of the scuttle, the decorative plate being removed (the decorative plate is indicated by dot and dash lines on the figure).

Referring to Figure 1 it will be observed that the scuttle is of somewhat oval form so as to permit the passage of the smaller diameter of the glass holder 5 through the larger diameter of the frame 3. This arrangement permits the removal and replacement of the glass holder 5 without having to remove a segment of the internal crown of the frame 3, the glass holder thus having a continuous bearing on the seat 6 of the frame 3 around the whole circumference of the scuttle so as to assure a perfectly watertight joint.

Figure 6:
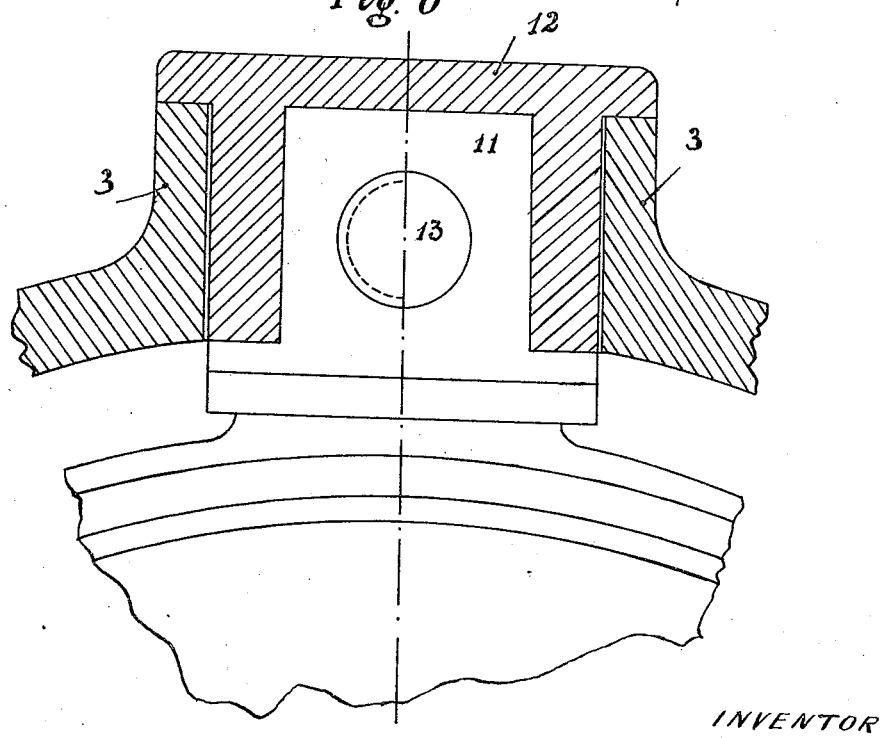
Figure 6 is a section on the line E—F of Figure 4.

Figure 1 shows the simplified construction and the decorative aspect that can be obtained with this type of scuttle. The decorative plates 1 which are adapted to cover the operating devices of the pinions 17 and toothed wheel 18 also maintain the decorative motifs 2 which may be of varnished wood plastic or ceramic material, or moulded glass (see Figure 6) and will be only apparent from the cabin; the frame 3 of the scuttle is fixed at its edge to the ship's side by its flange 3¹ and the portion of the frame 3 projecting into the cabin is considerably reduced by reason of the entrainment of the glass holder through independent parts.

In the embodiment illustrated in the drawings the glass holder is oval and the glass 4 is circular and is inserted in the glass holder 5 and maintained therein by a screw-threaded ring 7. An oval glass and corresponding glass holder may however be used the glass being maintained in the holder by an oval ring, which is itself held in position on the glass holder by means of screw-bolts.

A watertight packing 8 is provided on the glass holder 5.

The glass holder carries two pivots 9 extending in the direction of one of its diameters into apertures in the horizontal parts 10 of the two elbow-shaped sliding members, the vertical parts 11 of which each has at its center a capped aperture permitting the translatory movement of the whole in a direction parallel to the axis of the frame 3 of the scuttle, such movement being arranged to be effected by means of the screws 13.

This translatory movement of the glass holder will permit pivotal movement of the latter and ensures compression of the packing 8 when the glass holder is applied to the internal seat 6 of the frame 3 (inversely the packing 8 may be carried by the fixed part 3 and the seat 6 by the glass holder.)

It will be observed that preferably the rocking pivots 9 are not in median plane of the glass 4, but are disposed outwardly of this plane in order to diminish the displacement necessary for permitting the pivotal movement of the glass holder.

The sliding members are guided by the U-shaped members 12 so that the glass holder can, in one operation, be brought into position and applied to its seat on the frame 3.

The translatory movement of each bearing is arranged to be effected by means of the corresponding screw 13 supported on the flange 3¹ of the fixed frame 3 of the scuttle and traversing the fixed frame through a gland comprising a packing 14, cap 15 and a pressure screw 16. The end of the screw 13 is squared and the pinions 17 are mounted on these squared ends. One screw is arranged to be moved by a wheel or crank (not shown on the drawings), the movement of the other screw being effected through the intermediary of the toothed wheel 18 so as to cause a translatory movement of the glass-holder parallel to the axis of the frame 3 and consequently normal to the face of the watertight joint.

In order to remove the glass holder 5 from the interior of the fixed frame, the decorative plates 1 and U-shaped members 12 are first detached from the fixed frame whereupon the pinions 17, pressure screws 16, caps 15, packings 14 and screws 13, may be removed. Then the sliding members 10, 11 may be removed from the pivots 9. All of these operations may readily be performed from the cabin side of the scuttle and thereafter the glass holder may be withdrawn from the fixed frame 3 into the cabin through the seat ring or internal crown 6 with the smaller diameter of the oval holder along the larger diameter of the seat ring. In order to place the glass holder in position in the fixed frame 3, the parts may be replaced in the reverse order from that in which they were removed.

A weathertight member 19 having a packing 20, may, when required, be inserted between the glass holder 5 and the frame 3 of the scuttle. This watertight member, which is also oval, is adapted to be inserted from the interior of the cabin between the glass holder and the seat 6 should the glass be broken or should there be any danger of the glass being broken.

In order to maintain the glass holder in its open position, that is, with its plane parallel to the axis of the frame, the operating wheel or crank referred to hereinbefore, should be operated so as to bring the edge of the open glass holder against the seat 6 of the frame 3.

The decorative plates are secured to the frame 3 of the scuttle by means of screw-bolts 21.

It will be evident that the invention is not limited to the particular construction and arrangement of parts hereinabove described which may be varied as desired without exceeding the scope of the invention.

Having now particularly described and ascertained the nature of my said invention and in what manner the same is to be performed I declare that what I claim is:—

1. A ship's scuttle comprising a frame fixed to the ship's side, a seating crown of substantially oval formation fixed upon the internal portion of said frame and extending towards the outside of the ship, a pivoting glass holder normally seated upon said crown and arranged to be open from the inner side of the scuttle towards its outer side, said glass holder being of substantially oval formation so that it may be passed from the interior of the ship through the fixed frame along the larger diameter of the oval crown on the internal portion of the frame.

2. A ship's scuttle comprising a frame fixed to the ship's side, a seating crown of substantially oval formation fixed upon the internal portion of said frame and extending towards the outside of the ship, a pivoting displaceable glass holder normally seated upon said crown and arranged to be opened from the inner side of the scuttle towards its outer side, said glass holder being of substantially oval formation so that after displacement it may be passed from the interior of the ship through the fixed internal crown of the frame with its smaller diameter along the larger diameter of the fixed oval crown of the frame, and screw threaded elements positively connected with one another and operatively associated with the glass holder to displace the same.

3. A ship's scuttle comprising in combination a fixed frame having an integral internal continuous crown of substantially oval formation serving as a seat, a pivoting displaceable glass holder normally seated upon said crown and arranged to be opened from the inner side of the scuttle towards its outer side, said glass holder being of substantially oval formation so that after displacement it may be passed through the fixed internal crown of the frame with its smaller diameter along the larger diameter on the fixed crown of the frame, screw threaded elements positively connected with one another and operatively associated with the glass holder to displace the same, L-shaped members connecting the pivots of the glass holder to the screw threaded elements, and U-shaped guides detachably secured to the fixed frame to guide that portion of said L-shaped members engaging the screw threaded elements and serving to hold the glass holder in place.

4. A ship's scuttle comprising in combination a fixed frame having an integral internal continuous crown of substantially oval formation serving as a seat, a pivoting displaceable glass holder normally seated upon said crown and arranged to be opened from the inner side of the scuttle towards its outer side, said glass holder being of substantially oval formation so that after displacement it may be passed through the fixed internal crown of the frame with its smaller diameter along the larger diameter of the fixed crown of the frame, the pivots of said glass holder being disposed outwardly of the median plane of the glass in order to diminish the displacement necessary for permitting the pivotal movement of the glass holder, screw threaded elements positively connected with one another and operatively associated with the glass holder to displace the same, L-shaped members connecting the pivots of the glass holder to the screw threaded elements, and U-shaped guides detachably secured to the fixed frame to guide that portion of said L-shaped members engaging the screw threaded elements and serving to hold the glass holder in place.

5. A ship's scuttle comprising in combination a fixed frame provided with a flange and having an integral internal continuous crown of substantially oval formation for serving as a seat, a pivoting displaceable glass holder normally seated upon said crown and arranged to be opened from the inner side of the scuttle towards its outer side, said glass holder being of substantially oval formation so that after displacement it may be passed through the fixed internal crown of the frame with its smaller diameter along the larger diameter of the fixed crown of the frame, screw threaded elements positively connected with one another and operatively associated with the glass holder to displace the same, said screw threaded elements extending through the frame, a gland including a packing, a cap and a presser screw for supporting the screw threaded members upon the flange of the frame, L-shaped members connecting the pivots of the glass holder to the screw threaded elements, and U-shaped guides detachably secured to the fixed frame to guide that portion of said L-shaped members engaging the screw threaded elements and serving to hold the glass holder in place.

6. A ship's scuttle comprising in combination a fixed frame having an integral internal continuous crown of substantially oval formation serving as a seat, a pivoting glass holder normally seated upon said crown and arranged to be opened from the inner side of the scuttle towards its outer side, said glass holder being of substantially oval formation so that it may be passed through the fixed frame along the larger diameter of the internal crown of the fixed frame, and a plate of oval shape adapted to be introduced from the interior of the ship's cabin and maintained between the glass holder and the internal crown of the fixed frame.

RENÉ DUCROUX.